April 21, 1964 J. COVIELLO 3,130,276

TELEPHONE-HOLDING DEVICE

Filed Jan. 30, 1962

INVENTOR.
JOSEPH COVIELLO
BY
Kimmel & Crowell
ATTORNEYS.

United States Patent Office 3,130,276
Patented Apr. 21, 1964

3,130,276
TELEPHONE-HOLDING DEVICE
Joseph Coviello, 112 S. Chestnut St., Beacon, N.Y.
Filed Jan. 30, 1962, Ser. No. 169,966
2 Claims. (Cl. 179—157)

The present invention relates to a telephone-holding device. More specifically, the invention relates to a telephone-holding device which is adapted to engage a portion of the anatomy of the user to support a telephone hand set.

The primary object of the invention is a telephone-holding device adapted to engage a portion of the anatomy of the user to support a telephone hand set leaving the hands of the user free to write transmitted messages or perform other tasks.

Another object of the invention is a telephone-holding device having means adapted to rest against the body of the user in the manner of a pad to allow the telephone hand set to be supported without discomfort.

Another object of the invention is a telephone-holding device wherein the means adapted to rest against the body of the user provide a stable base for an arm on which a telephone hand set is supported.

Another object of the invention is a telephone-holding device having a resilient clamp adapted to clampingly engage and be retained on a telephone hand set and having means thereon to removably receive a support arm.

Another object of the invention is a telephone-holding device having a simple construction, and which is economical to manufacture.

Other objects and advantages of the invention will become readily apparent by referring to the following detailed description when taken with the accompanying drawings wherein.

Figure 1:
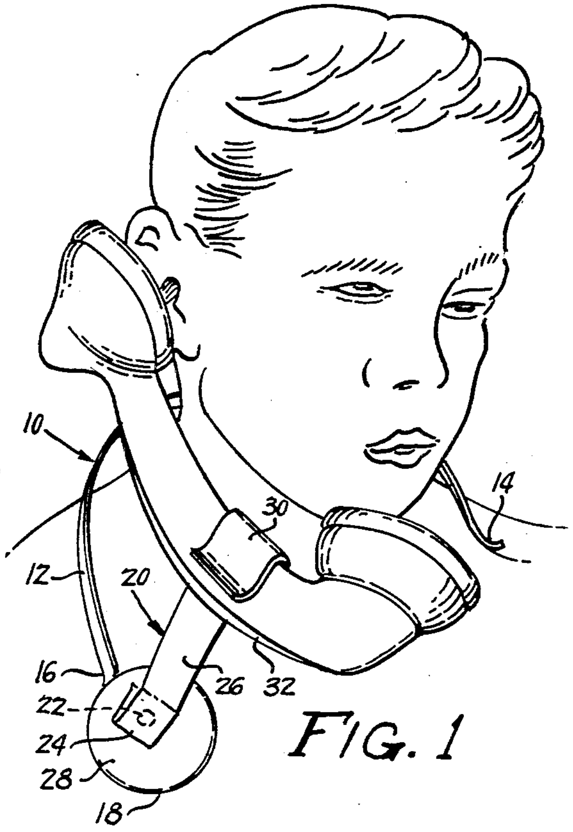
FIGURE 1 is an illustration showing the telephone-holding device in use and the manner in which it engages the anatomy of the user.

Referring now to the drawings in detail, the telephone-holding device of the present invention is indicated generally by the reference numeral 10. As shown, the device comprises an arcuate suspension band 12 preferably formed of plastic material or the like and outwardly curved at one end 14 to preclude the possibility of its catching in or damaging clothing of the user. The other end 16 of the arcuate band 12 has fixed thereto by any suitable means a circular plate 18.

A support arm 20 is pivotally connected to circular plate 18 by means of pivot pin 22. The portion 24 of support arm 20 which is pivotally connected to circular plate 18 is offset whereby the free end 26 of support arm 20 extends angularly upwardly from the surface 28 of circular plate 18. The purpose of the angular relationship between the free end 26 of support arm 20 and the surface 28 of circular plate 18 will be later described.

Figure 2:
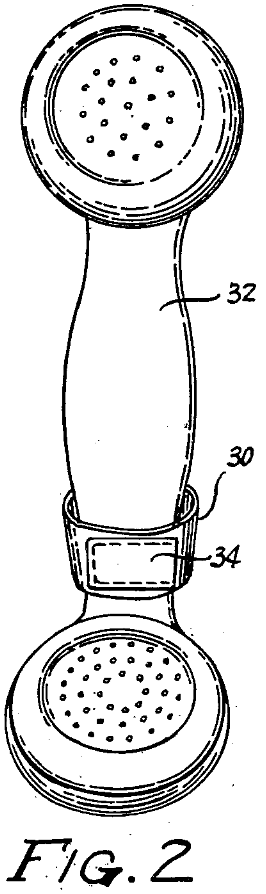
FIGURE 2 shows a telephone hand set having a resilient clamp engaged thereon which forms part of the telephone-holding device.
Figure 3:
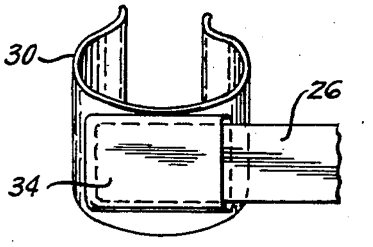
FIGURE 3 is an enlarged view of the clamp shown in FIGURE 2.

A resilient substantially C-shaped clamp 30 is provided to clampingly engage and be retained on a telephone hand set 32 in the position shown in FIGURE 2. The clamp 30 is provided with a socket 34 which is adapted to removably receive the free end 26 of support arm 20 as shown in FIGURE 3.

Figure 4:
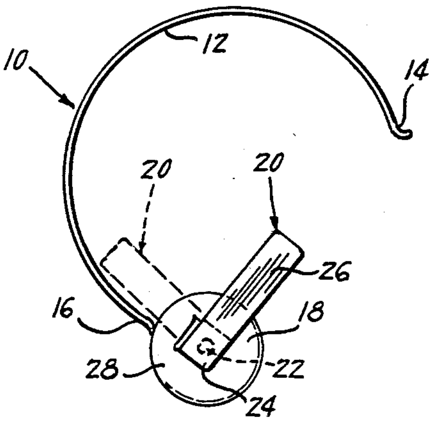
FIGURE 4 is a plan view of the device shown in FIGURE 1 with the telephone hand set removed.

As previously mentioned, the clamp 30 is retained on the telephone hand set 32. The suspension band, circular plate, and support arm assembly, 12, 18, and 20 respectively, is placed in any convenient location near the telephone. The support arm 20 is normally in a first position shown by dotted lines in FIGURE 4 adjacent the band 12 and moved to a second position spaced therefrom shown in full lines when in use.

When it is desired to use the device 10, in order to leave the hands of the user free, the arcuate suspension band 12 is placed in encircling engagement on the neck of the user, and the circular plate 18 fixed to the end 16 thereof rests against the user's body. The support arm 20 is pivoted relative to circular plate 18 from its first position to its second position. The telephone hand set 32 having clamp 30 thereon is positioned to allow the free end 26 of support arm 20 to be received in socket 34. The angular relation between the free end 26 of support arm 20 and the surface 28 of circular plate 18 causes the telephone hand set 32 to be properly positioned as shown in FIGURE 1.

The circular plate 18 has a dimension which allows the weight of the telephone hand set 32 to be distributed over a relatively large area so that the device 10 can be used during prolonged conversations without discomfort. Also the circular plate 18 provides a stable base for the support arm 20.

While the invention has been described in its preferred embodiment, modifications and variations will become apparent to those skilled in the art. Such modifications and variations are considered to be within the purview of the appended claims.

What is claimed is:

1. A telephone hand set-holding device comprising an arcuate neck encircling suspension band, an enlarged bearing plate fixed to one end of said arcuate band and adapted to rest against the body of the user when said arcuate band is in neck encircling position, an arm pivotally connected at one end to said plate and extending angularly upwardly from the surface thereof, a resilient clamp clampingly engaging a telephone hand set and retained thereon, and a socket on said clamp removably receiving the free end of said arm to support the telephone hand set.

2. The structure of claim 1 wherein said arm is movable from a first position adjacent said band to a second position spaced therefrom.

References Cited in the file of this patent

UNITED STATES PATENTS

| | | |
|---|---|---|
| 2,625,612 | Rheins et al. | Jan. 13, 1953 |
| 2,822,433 | Sanford | Feb. 4, 1958 |

FOREIGN PATENTS

| | | |
|---|---|---|
| 282,887 | Switzerland | Sept. 1, 1952 |